(12) United States Patent
Glavieux et al.

(10) Patent No.: US 6,763,076 B1
(45) Date of Patent: Jul. 13, 2004

(54) EQUALIZING AND DECODING DEVICE FOR A FREQUENCY-SELECTIVE DIGITAL TRANSMISSION CHANNEL

(75) Inventors: Alain Glavieux, Plouzane (FR); Joël Labat, Plougastel Daoulas (FR); Christophe Laot, Plougonvelin (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/423,994
(22) PCT Filed: May 13, 1998
(86) PCT No.: PCT/FR98/00951
§ 371 (c)(1), (2), (4) Date: Mar. 6, 2000
(87) PCT Pub. No.: WO98/52329
PCT Pub. Date: Nov. 19, 1998

(30) Foreign Application Priority Data

May 15, 1997 (FR) ............................................ 97 05978

(51) Int. Cl.[7] ............................ H04B 1/10; H04B 17/00
(52) U.S. Cl. ......................... 375/346; 375/232; 375/350
(58) Field of Search ................................. 375/229, 232, 375/341, 347, 348, 350, 233, 260, 262, 265, 324, 340, 346; 333/18, 28, 28 R; 708/319, 322, 323

(56) References Cited

U.S. PATENT DOCUMENTS 5,265,125 A  * 11/1993 Ohta ............................ 375/229
6,205,170 B1 *  3/2001 Nunez Leon De Santos et al. ............................ 375/219
6,360,369 B1 *  3/2002 Mahoney ..................... 725/111

FOREIGN PATENT DOCUMENTS

WO    WO 9624999    9/1998

OTHER PUBLICATIONS

Kubo et al. Adaptive Maximum–Likelihood Sequence Estimation by Means of Combined Equalization and Decoding in Fading Environments, Jan. 1995, IEEE, vol. 13, No. 1, pp. 102–109.*

Baccarelli et al., A New Form of Combined Adaptive Equalization and Decoding for TCM Signals over Fast Time–Variant Multipath Links, Apr. 1997, IEEE, pp. 13–16.*

Fechtel et al., M–Algorithm Combine Equalization and Decoding for Mobile/Personal Communications, 1995, IEEE, pp. 1818–1822.*

The Bell System Technical Journal; "Adaptive Cancellation of Intersymbol Interference for Data Transmission" by A. Gersho, vol. 60, Nov. 1981, No. 11, pp. 1997–2021.

The Bell System Technical Journal: "A Unified Theory of Data–Aided Equalization" by M.S. Mueller and J. Salz pp. 2023–2038.

M. Vedat Eyuboglu "Detection of Coded Modulation Signals on Linear, Severly Distorted Channels Using Decision Feedback Noise Prediction With Interleaving" IEEE vol. 36, No. 4, pp. 401–409, Apr. 1988.

(List continued on next page.)

Primary Examiner—Young T. Tse
Assistant Examiner—Sam K. Ahn
(74) Attorney, Agent, or Firm—Blakely Sokoloff Taylor & Zafman

(57) ABSTRACT

Equalizing and decoding apparatus including a module which comprises an equalizer and a weighted output decoder, the apparatus being characterized in that it comprises a plurality of modules of said type in series, in which each equalizer has at least one transversal filter for reducing noise power and in which each module of rank greater than 1 also receives a stream of channel samples that has been delayed by a quantity equal to the processing time of the preceding modules.

6 Claims, 5 Drawing Sheets

OTHER PUBLICATIONS

K. Zhou, J. Proakis, F. Ling; "Decision Feedback Equalization of Time Dispersive Channels with Coded Modulation" 1990 IEEE Transaction on Communication, vol. 38, No. 1.

K. Zhou, J. Proakis "Coded Reduced Bandwidth QAM With Decision Feedback Equalization" Department of Electrical and Computer Engineering—pp. 0380–0394.

Berrou C. et al.: "Near Shannon Limit Error correcting Coding and Decoding: Turbo–Codes(1)" Proceedings of the International Conference on Communications May 23–26, 1993, pp. 1064–1070 vol. 1–2–03.

Douillard: "Iterative Correction of Intersymbol Interference: Turbo–Equalization" European Transactions On Telecommunications, vol. 6, No. 5, Oct. 1995 pp. 507–511.

Sedat et al.: "Soft Decision Multistage Decoding of Multilevel Coded Quaternary Partial–Response Signals" Proceedings of the International Symposium on Information Theory, Jun. 27–Jul. 1, 1994 pp. 1242–1248 IEEE.

* cited by examiner

EQUALIZING AND DECODING DEVICE FOR A FREQUENCY-SELECTIVE DIGITAL TRANSMISSION CHANNEL

RELATED APPLICATION

This application is a 371 of PCT/FR98/00951, filed May 13, 1998.

The present invention relates to equalization and decoding apparatus for a frequency-selective digital transmission channel.

SUMMARY OF THE STATE OF THE ART

In digital transmission, a receiver can be considered as being a plurality of elementary functions in cascade, each function performing specific processing such as filtering, demodulation, equalizing, decoding, etc.

In general, the processing performed by any one elementary function makes use of only a portion of the information made available thereto, and as a result the overall performance of a receiver is suboptimal.

An object of the invention is to remedy that drawback.

Various authors have already proposed overcoming the intersymbol interference that a channel introduces by using various types of receiver based on equalizers or detectors relying on maximum likelihood, and sometimes referred to by the misnomer "Viterbi equalizers". The most significant contributions in this field are the following:

[1] A. Gersho, and T. L. Lim, "Adaptive cancellation of intersymbol interference for data transmission", The Bell System Technical Journal, Vol. 60, No. 11, pp. 1997–2021, November 1981.

[2] M. S. Mueller, and J. Salz, "A unified theory of data-aided equalization", The Bell System Technical Journal, Vol. 60, No. 9, pp. 2023–2038, November 1981.

In those articles, the authors propose a receiver which combines an adapted filter and an interference canceller to eliminate interference between symbols as introduced by the frequency selectivity of a channel, and without raising the noise level. The interference canceller is fed with decoded symbols (firm decisions) previously produced by a receiver constituted by a simple transversal filter. The difference compared with the invention lies in the fact that firstly our equalizer is fed with weighted decisions generated by a channel decoder, and secondly that we use a process that is iterative. Naturally, the receivers described in [1] and [2] provide performance that is not as good as that of the proposed invention.

Proposals have also been made in:

[3] V. M. Eyuboglu, "Detection of coded modulation signals on linear, severely distorted channels using decision feedback noise prediction with interleaving", IEEE Transactions on Communications, Vol. 36, No. 4, pp. 401–409, April 1988, to use a decision feedback equalizer and a channel decoder combined with a periodic interleaver. The author shows that under some conditions this approach enables the equalizer to make use of the outputs from the decoder by astute management of the delays introduced by the decoder. Naturally, the performance obtained is never better than that of a decision feedback equalizer controlled by the transmitted data. The system described in [3] presents performance that is less good than the proposed invention.

Reference can also be made to:

[4] K. Zhou, J. G. Proakis, and F. Ling, "Decision feedback equalization of fading dispersive channels with trellis-coded modulation", Int. Conf. Commun. Tech., Nanjing, China, November 1987.

[5] K. Zhou, and J. G. Proakis, "Coded reduced-bandwidth QAM with decision feedback equalization", Conf. Rec. IEEE Int. Conf. Commun., Philadelphia, Pa., pp. 12.6.1–12.6.5, June 1988.

Those two contributions propose a procedure analogous to that followed by V. M. Eyuboglu, but for channels with fading and for a decision feedback equalizer using a criterion of the recursive least-squares (RLS) lattice type. The convergence rate of the equalizer is better than in reference [3], but performance in terms of error rate remains unchanged.

In addition, in:

[6] C. Douillard, A. Glavieux, M. Jézéquel, and C. Berrou, "Dispositif de réception de signaux numériques à structure itérative, module et procédé correspondents" [Digital signal receiver apparatus of iterative structure, and corresponding module and method], French patent No. 95 01603, France Télécom, TDF, February 1995, it has been proposed to associate a maximum likelihood detector (Viterbi equalizer) with a channel decoder, via an iterative process which makes it possible to manage the various delays introduced by the decoder.

Nevertheless, the apparatus described in that publication is suitable only for channels having response durations that are of the order of a few symbols.

The apparatus proposed by the invention is more particularly adapted to equalizing channels having time responses that are spread over a large number of symbols.

SUMMARY OF THE INVENTION

The invention provides equalizing and decoding apparatus including a module which comprises an equalizer and a weighted output decoder, the apparatus being characterized in that it comprises a plurality of modules of said type in series, in which each equalizer has at least one transversal filter for reducing noise power, and in which each module of rank greater than 1 also receives a stream of channel samples that has been delayed by a quantity equal to the processing time of the preceding modules.

Preferably, in each module of rank greater than 1, each equalizer includes another transversal filter which is designed to reconstruct the intersymbol interference present at the output of the first filter and which receives the output from the preceding module, the output of the equalizer corresponding to the output of the first filter minus the intersymbol interference as reconstructed by the second filter.

Advantageously, for modules of rank greater than 1, the transversal filter which receives the stream of channel samples is a filter which converges towards an adapted filter.

Thus, the apparatus comprises a plurality of modules in cascade, each module having an equalizer and a weighted-output decoder.

The equalizer of the module of rank 1 has a transversal filter for reducing both noise power and intersymbol interference. It receives a stream of samples from the demodulator.

In a preferred variant, the equalizer of each module of rank greater than 1 has two transversal filters. The first is adapted to the channel and serves solely to reduce noise power while the second is for reconstructing the intersymbol interference present at the output of the adapted filter. The adapted filter receives a stream of samples from the demodulator delayed by a quantity equal to the processing time of the preceding modules, and the second transversal filter is fed with the stream of symbol mean values as calculated from the output of the channel decoder of the preceding module. The output from the equalizer is equal to the output from the adapted filter minus the intersymbol interference as reconstituted by the second filter.

Thus, with such an iterative structure, the equalizer makes use both of the output from the demodulator and of the output from a channel decoder in an attempt to overcome the intersymbol interference introduced by the selectivity of the channel. It takes account simultaneously of the characteristics of the transmission channel and of the redundancy introduced by the encoding function in order to perform its processing.

It is then possible to obtain performance analogous to that of a channel having additive white Gaussian noise without intersymbol interference and with encoding.

In a variant, the equalizer could equally be of the feedback decision type.

DETAILED DESCRIPTION OF AN EMBODIMENT

The Transmission System

Figure 1:
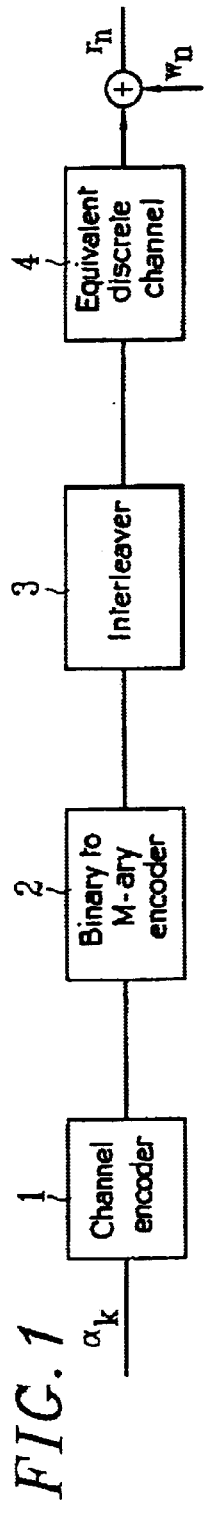
FIG. 1 is a block diagram outlining a transmission system.

FIG. 1 outlines a transmission system for binary data $\alpha_k$ issued by a data source at a rate of one bit every $T_b$ seconds.

This data $\alpha_k$ is encoded by a channel encoder 1. Each set of 2 m code bits $c_{n,i}$; i=1 . . . 2 m, is associated by an M-ary to binary encoder 2 with a complex symbol $d_n=a_n+jb_n$ of variance $\sigma^2_d$. The symbols $d_n$ are interleaved by an interleaver 3 and then issued at a rate of one symbol every T seconds (T=$T_b\log_2 M$). The symbols $a_n$ and $b_n$ take their values from the set $\{\pm 1, \pm 3, \ldots, \pm(2i+1) \ldots \pm(\sqrt{M}-1)\}$ where $\sqrt{M}=2^m$, and they are used for amplitude modulation of two carriers in quadrature (M-QAM modulation).

The system comprising a modulator, a demodulator, a transmission medium, transmission filters, and reception filters is represented in FIG. 1 by an equivalent discrete channel 4 which is disturbed by additive noise $w_n$. The output $r_n$ from the equivalent discrete channel is of the following form:

$$r_n = \sum_{k=-L_1}^{L_2} \Gamma_k(n)d_{n-k} + w_n$$

where the $\Gamma_k(n)$ terms are the coefficients, possibly complex coefficients, of the equivalent discrete channel, and it is assumed that they are normalized, e.g. that these coefficients satisfy the conventional assumption:

$$\sum_{k=-L_1}^{L_2} E\{|\Gamma_k(n)^2|\} = 1$$

The quantities $w_n$ are samples of white noise that are centered, Gaussian, independent of the symbols $d_n$, and of variance $\sigma^2_w$.

The equivalent discrete channel has a transfer function C(f), and it therefore introduces intersymbol interference whose causal and anti-causal portions bear respectively on $L_2$ symbols and on $L_1$ symbols.

$$C(f) = \sum_{k=-L_1}^{L_2} \Gamma_k(n)\exp{-j2\pi fkT}$$

General Structure of the Apparatus

In the proposed apparatus, the processing performed by the equalizer and the channel decoder takes place iteratively.

Figure 2:
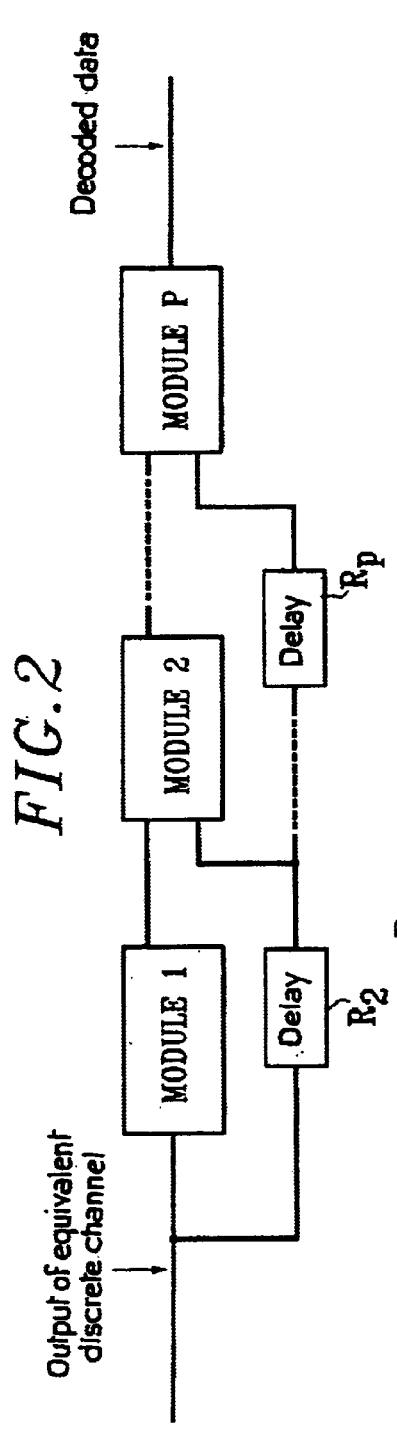
FIG. 2 is a block diagram outlining the iterative structure of decoding equalizer apparatus constituting a possible embodiment of the invention.

A block diagram of this kind of apparatus is shown in FIG. 2. The apparatus shown in this figure corresponds to P elementary modules in which each module p; p=1 . . . P corresponds to one iteration. A module has a plurality of functions including, in particular, an equalizer and a channel decoder. The input of a module p such that $1<p\leq P$ is constituted firstly by the stream of samples $\{r_n\}_{p-1}$ from the equivalent discrete channel and delayed by delay lines $R_2, \ldots, R_p$ by a quantity equal to (p-1) times the processing time of a module (module latency) and secondly by a stream of mean values $\{\bar{d}_n\}_{p-1}$ of the symbols $d_n$ as calculated from the output of the channel decoder belonging to the module (p-1). When performing its treatment, the equalizer belonging to a module $1<p\leq P$ can thus benefit both from the output of the equivalent discrete channel and from the redundancy introduced by the encoder.

The equalizer belonging to the first module (p=1) can perform its processing only on the information coming from the equivalent discrete channel.

Structure of an Elementary Module

Figure 3:
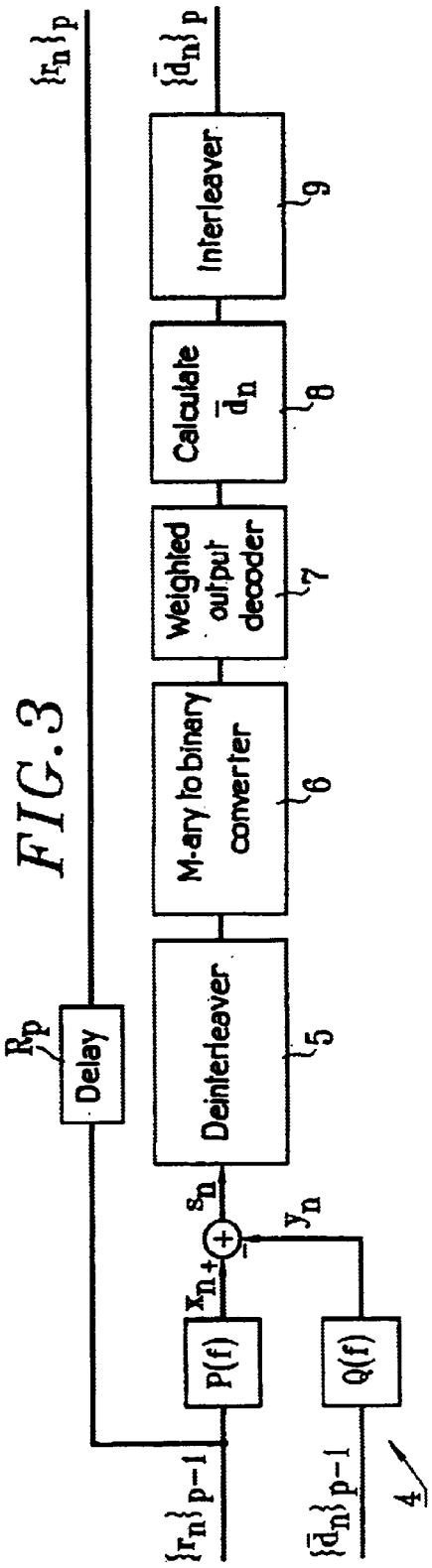
FIG. 3 is a block diagram showing the structure of a module in the structure shown in FIG. 2.

FIG. 3 shows the Structure of the $p^{th}$ elementary module which is constituted by an equalizer 4, a deinterleaver 5, an M-ary to binary converter 6, a weighted output channel decoder 7, a function for evaluating the mean value $\bar{d}_n$ 8 of the symbols $d_n$, and an interleaver 9.

Structure of the Equalizer

In the example shown in FIG. 3, the equalizer 4 is of the interference canceller type.

It is made up of two transversal filters having respective frequency responses P(f) and Q(f). For $1<p\leq P$, the input to the filter P(f) is constituted by the stream of samples $\{r_n\}_{p-1}$ and the input to the filter Q(f) is constituted by the stream of mean values $\{\bar{d}_n\}_{p-1}$.

The filter P(f) which converges over the iterations on a filter adapted to the response C(f) of the channel possesses $(L_1+L_2+1)$ coefficients and serves solely to reduce the power of the noise $w_n$. The theoretical equation for this adapted filter is:

$$P(f) = \frac{\sigma_d^2}{\sigma_d^2 + \sigma_w^2} \sum_{k=-L_2}^{L_1} \Gamma_{-k}^* \exp{-j2\pi fkT}$$

where the notation * means the conjugate of a coefficient.

The filter Q(f) whose central coefficient is fixed at zero ($q_0=0$) serves, as the iterations take place, to reconstruct the intersymbol interference present at the output of the filter P(f) on the basis of the quantities $\{\bar{d}_n\}_{p-1}$. It possesses $(2L_1+2L_1+1)$ coefficients at the most. The theoretical equation for the optimum Q(f) filter is given by:

$$Q(f) = \frac{\sigma_d^2}{\sigma_d^2 + \sigma_w^2} \sum_{k=-(L_1+L_2)}^{(L_1+L_2)} q_k \exp{-j2\pi fkT}$$

where:

$$q_k = \sum_{j=-L_1}^{L_2} \Gamma_{j-k}^* \Gamma_j - \delta_{k,0}$$

The output $s_n$ from the equalizer is then obtained merely by subtracting the intersymbol interference $y_n$ as reconstituted by the filter Q(f) from the output $x_n$ of the filter P(f).

The equalizer belonging to the first module (p=1) is constituted by a single filter having the response P(f), which is not adapted to C(f), but which serves simultaneously to minimize both the noise power and the intersymbol interference present at the output from the equivalent discrete channel 4.

Calculating the Coefficients of the Equalizer Filters

The coefficients of the equalizer filters are determined adaptively, by using a stochastic gradient algorithm based on the least squares error between the output $s_n$ from the equalizer and the decoded data item $\hat{d}_n$.

Using the notation $$P_n = [p_{-L_2}^n \ldots p_0^n \ldots p_{L_1}^n]^t \text{ and } Q_n = [q_{-(L_1+L_2)}^n \ldots 0 \ldots q_{(L_1+L_2)}^n]^t$$

for the vectors whose components are respectively the coefficients of the filters P(f) and Q(f) at instant nT, it is possible to write:

$$P_{n+1} = P_n - \mu R_n^*(S_n - \hat{d}_n)$$

and $$Q_{n+1} = Q_n + \mu' \bar{D}_n^*(S_n - \hat{d}_n) \quad (1)$$

where:

$$R_n = [r_{n-L_1} \ldots r_n \ldots r_{n+L_2}]^t \text{ and } \bar{D}_n = [\bar{d}_{n-L_1-L_2} \ldots \bar{d}_n \ldots \bar{d}_{n+L_1+L_2}]^t$$

(where t designates the transposed function), are respectively the observation vector and the vector of mean values for the symbols $d_n$ produced by the module (p−1) and used by the equalizer at instant nT. $\mu$ and $\mu'$ are two adaptation stepsize coefficients and $\hat{d}_n = \hat{a}_n + j\hat{b}_n$ is the symbol as decoded from the quantities $\bar{d}_n = \bar{a}_n + j\bar{b}_n$ as produced by the module (p−1).

Naturally, other methods of adaptively estimating the coefficients of the filters can be envisaged, e.g. RLS estimation methods.

For M-QAM modulation, the rule for decoding the symbols $a_n$ and $b_n$ is as follows (2):

$\hat{a}_n = (M-1)$ if $\bar{a}_n > (M-2)$ $\hat{b}_n = (M-1)$ if $\bar{b}_n > (M-2)$ $\hat{a}_n = (2i+1)$ if $2i < \bar{a}_n < 2i+2$ $\hat{b}_n = (2i+1)$ if $2i < \bar{b}_n < 2i+2$ $\hat{a}_n = -(2i+1)$ if $-2i-2 < \bar{a}_n < -2i$ $\hat{b}_n = -(2i+1)$ if $-2i-2 < \bar{b}_n < -2i$ $\hat{a}_n = -(M-1)$ if $\bar{a}_n < -(M-2)$ $\hat{b}_n = -(M-1)$ if $\bar{b}_n < -(M-2)$ For the first module (p=1), only the coefficients of the filter P(f) are to be updated. For this purpose, equation (1) is still used, but $\hat{d}_n$ is the symbol as decoded from the output $s_n = u_n + jv_n$ of the equalizer. The decoding rule is still given by equation (2) by replacing $\bar{a}_n$ with $u_n$ and $\bar{b}_n$ with $v_n$.

The Interleaver and the Deinterleaver

Interleaving is performed on the symbols $a_n$ and $b_n$ which are written row by row in a matrix of dimension $N_1 = N$, $N_2 = N/\log_2 \sqrt{M}$. The parameter N must be equal to a power of 2 greater than $M = 2^P$.

For a pair (i, j); i being fixed (i=0, 1, ..., ($N_1$−1)) and for j varying from 0 to ($N_2$−1), the coordinates ($i_1$, $j_1$) of the symbol as issued are as follows:

$I_1 = 2 \text{ mod}_{N1/2}(x)+1$ $J_1 = \text{mod}_{N2}(yj)$ where $\text{mod}_1$ means modulo 1 with:

$x = \frac{1}{2}(2j+i)$ if $\underline{i}$ is even $x = \frac{1}{2}(2j+i-1)$ if $\underline{i}$ is odd and:

| | |
|---|---|
| y = 7 if z = 0 | y = 29 if z = 4 |
| y = 17 if z = 1 | y = 13 if z = 5 |
| y = 11 if z = 2 | y = 21 if z = 6 |
| y = 23 if z = 3 | y = 19 if z = 7 | where $\underline{z}$ is equal to $\underline{x}$ modulo 8.

Since the function of the deinterleaver 9 is the dual of the interleaver 3, its implementation can be deduced directly from the above.

Such interleaving of symbols is particularly advantageous. It makes it possible in particular to overcome noise in various metrics, with performance at the output of the decoder then being better than if interleaving had been performed on the binary data. Interleaving at symbol level also makes it possible to use trellis-encoded modulation.

The M-ary to Binary Converter

M-ary conversion makes it possible to use a channel decoder whose structure is independent of the number of states in the M-QAM modulation.

The M-ary to binary converter 6 associates each sample $s_n$ with 2m samples representative of the 2m encoded binary data items $c_{n,i}$; i=1, 2, . . . , 2m.

The 2m samples associated with each sample $s_n$ can be obtained by calculating the logarithm of the likelihood ratio (LLR) of the encoded data from the samples $s_n$ by using the following relationship:

$$\Lambda(c_{n,i}) = K \log \frac{Pr\{c_{n,i} = 1/s_n\}}{Pr\{c_{n,i} = 0/s_n\}} \quad i = 1, 2, \ldots, 2m$$

where K is a constant.

Since expressions for the LLR of encoded data are relatively complicated, they can be approximated, for Gray code and for $K=\beta\sigma^2_w/2$ by the following expressions:

$$\Lambda(c_{n,m}) = |u_n| - \beta 2^{m-1}$$

$$\Lambda(c_{n,i}) = |\Lambda(c_{n,i+1})| - \beta 2^{i-1}; \quad i=(m-1) \ldots 2$$

$$\Lambda(c_{n,1}) = u_n$$

and:

$$\Lambda(c_{n,2m}) = |v_n| - \beta 2^{m-1}$$

$$\Lambda(c_{n,i+m}) = |\Lambda(c_{n,i+1+m})| - \beta 2^{i-1}; \quad i=(m-1) \ldots 2$$

$$\Lambda(c_{n,m+1}) = v_n$$

where $\beta = \sigma_d^2/(\sigma_d^2 + \sigma_w^2)$.

When M=4, i.e. for four-state phase shift keying (4-PSK), there is no need to insert an M-ary to binary converter between the output of the deinterleaver and the input of the decoder, since the symbols $a_n$ and $b_n$ are binary.

The Channel Decoder and Calculating the Mean Values of the Symbols $d_n$

After deinterleaving, the samples $\Lambda(c_{n,i})$ are presented to the input of a weighted-output channel decoder, and, for example if the encoding is of the convolutional type, making use of a Berrou-Adde algorithm as described in:

[7] C. Berrou, P. Adde, E. Angui, and S. Faudeil, "A low complexity soft-output Viterbi decoder architecture", ICC'93, Geneva, Switzerland, May 1993. The decoder produces a new approximate value $\tilde{\Lambda}(c_{n,i})$ for the logarithm of the likelihood ratio (LLR) of the encoded data.

$$\tilde{\Lambda}(c_{n,i}) = \frac{1}{l} \log \frac{Pr\{c_{n,i} = 1/\text{observation}\}}{Pr\{c_{n,i} = 0/\text{observation}\}} \quad (3)$$

where $1/\lambda$ is a coefficient.

The quantity $\Lambda(c_{n,i})$ can also be put in the form:

$$\Lambda(c_{n,i}) = k\tilde{\Lambda}(c_{n,i}) + W(c_{n,i}) \quad (4)$$

where $\underline{k}$ is a constant equal to 2 in the Berrou-Adde algorithm, and where $W(c_{n,i})$ is the extrinsic information associated with the data $c_{n,i}$.

To feed the filter Q(f) of the equalizer, given that the symbols $d_n$ are unknown, they are replaced by their mean values $\bar{d}_n = \bar{a}_n + j\bar{b}_n$ as calculated from $\Lambda(c_{n,i})$ at the first iteration and by the intrinsic information $W(c_{n,i})$ for the following iterations.

The use of $\Lambda(c_{n,i})$, and then solely of $W(c_{n,i})$ when calculating the mean value for the data $d_n$ enables the greatest possible advantage to be taken of the information coming from the decoder while satisfying the fundamental rule whereby the input to the decoder at an instant $\underline{n}$ must not depend on the extrinsic information $W(c_{n,i})$ that it produces at the preceding iteration.

16-QAM modulation

For 16-QAM modulation, each symbol $d_n = a_n + jb_n$ is associated with four encoded data items ($c_{n,i}$; i=1, 2, 3, 4). When Gray code is used, the following can be written:

$$\bar{a}_n = 3Pr\{c_{n,1}=1, c_{n,2}=1\} + 1Pr\{c_{n,1}=1, c_{n,2}=0\} - 1Pr\{c_{n,1}=0, c_{n,2}=0\} - 3Pr\{c_{n,1}=0, c_{n,2}=1\} \quad (5)$$

$$\bar{b}_n = 3Pr\{c_{n,3}=1, c_{n,4}=1\} + 1Pr\{c_{n,3}=1, c_{n,4}=0\} - 1Pr\{c_{n,3}=0, c_{n,4}=0\} - 3Pr\{c_{n,3}=0, c_{n,4}=1\} \quad (6)$$

Given that the data items $c_{n,i}$ associated with the symbols $d_n$ are mutually independent due to the presence of the interleaver, and using relationships (3), (5), and (6), the mean symbol values $\bar{a}_n$ and $\bar{b}_n$ as calculated at the first iteration are respectively equal to:

$$\bar{a}_n = \frac{3e^{\lambda[\tilde{\Lambda}(c_{n,1})+\tilde{\Lambda}(c_{n,2})]} + e^{\lambda\tilde{\Lambda}(c_{n,1})} - 1 - 3e^{\lambda\tilde{\Lambda}(c_{n,2})}}{[1 + e^{\lambda\tilde{\Lambda}(c_{n,1})}][1 + e^{\lambda\tilde{\Lambda}(c_{n,2})}]} \quad (7)$$

and:

$$\bar{b}_n = \frac{3e^{\lambda[\tilde{\Lambda}(c_{n,3})+\tilde{\Lambda}(c_{n,4})]} + e^{\lambda\tilde{\Lambda}(c_{n,3})} - 1 - 3e^{\lambda\tilde{\Lambda}(c_{n,4})}}{[1 + e^{\lambda\tilde{\Lambda}(c_{n,3})}][1 + e^{\lambda\tilde{\Lambda}(c_{n,4})}]} \quad (8)$$

For the following iterations, the mean values of the symbols $\bar{a}_n$ and $\bar{b}_n$ are still given by relationship (7) and (8), but with $\Lambda(c_{n,i})$ being replaced by $W(c_{n,i})$

4-PSK modulation

For four-state phase shift keying (4-PSK) the expressions (5) and (6) are simpler and become:

$$\bar{a}_n = 1Pr\{c_{n,1}=1\} - 1Pr\{c_{n,1}=0\} \quad (9)$$

$$\bar{b}_n = 1Pr\{c_{n,2}=1\} - 1Pr\{c_{n,2}=0\} \quad (10)$$

and thus by using relationships (3), (9), and (10), the mean values of the symbols $\bar{a}_n$ and $\bar{b}_n$ as calculated in the first iteration are respectively equal to:

$$\bar{a}_n = \frac{e^{\lambda\tilde{\Lambda}(c_{n,1})} - 1}{e^{\lambda\tilde{\Lambda}(c_{n,1})} + 1} \quad (11)$$

$$\bar{b}_n = \frac{e^{\lambda\tilde{\Lambda}(c_{n,2})} - 1}{e^{\lambda\tilde{\Lambda}(c_{n,2})} + 1} \quad (12)$$

For the following iterations, the mean values of the symbols $a_n$ and $b_n$ are always given by relationships (11) and (12), but with $\Lambda(c_{n,i})$ being replaced by $W(c_{n,i})$ as above.

Performance of Apparatus of the Type Described Above

To evaluate the performance of the apparatus, two models for the equivalent discrete channel have been used, a first as proposed by Porat and Friedlander and having complex coefficients, and a second as proposed by Proakis and having real coefficients. Those channels possess transfer functions whose zeros are more or less close to the unit circle, i.e. more or less easy to equalize.

A Porat and Friedlander Channel

Figure 4:
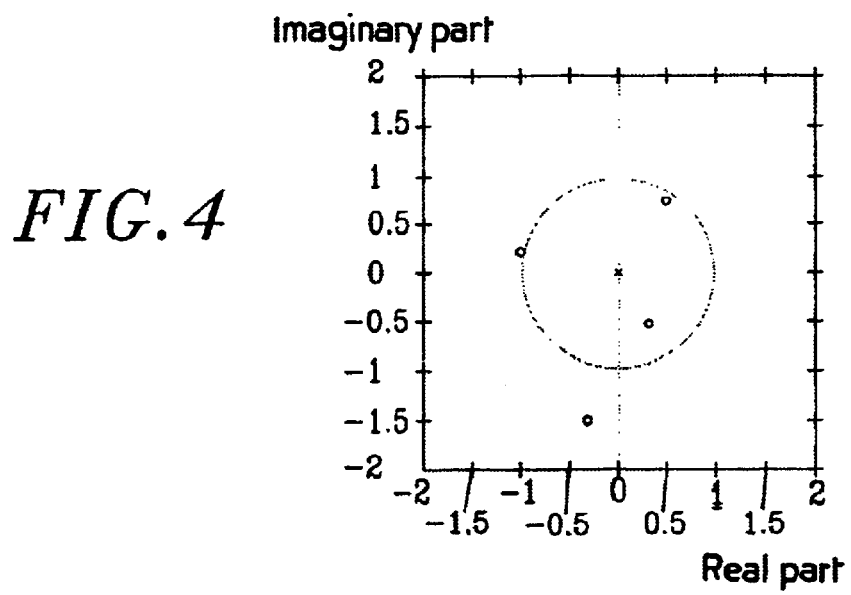
FIG. 4 is a graph on which there are plotted the zeros of the transfer function of a Porat and Friedlander channel.

A Porat and Friedlander channel has five coefficients $\Gamma_k$ which are constant, and four of them are complex. The positions of the zeros on the unit circle of the transfer function of this channel are shown in FIG. 4.

[2−0.4j; 1.5+1.8j; 1.2−1.3j; 0.8+1.6j]

Figure 5:
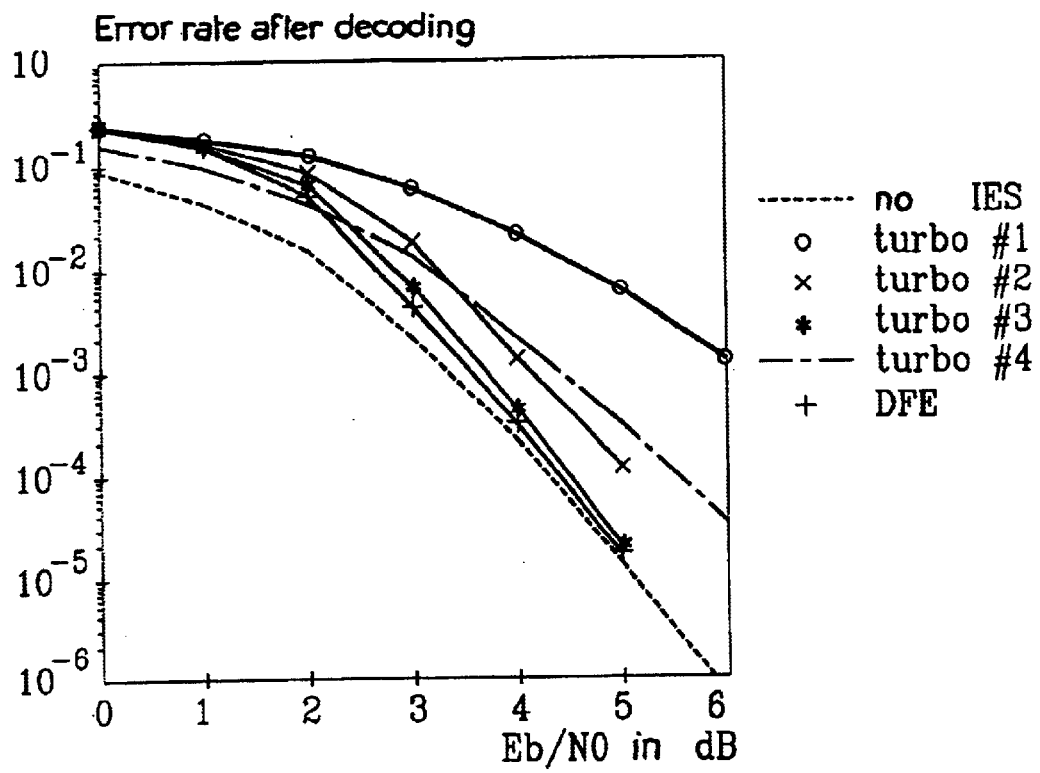
FIG. 5 is a graph showing the error rate after decoding as a function of the ratio $E_b/N_0$ illustrating the performance of apparatus of the type shown in FIGS. 2 and 3 for 4-PSK modulation on a Porat and Friedlander channel.
Figure 6:
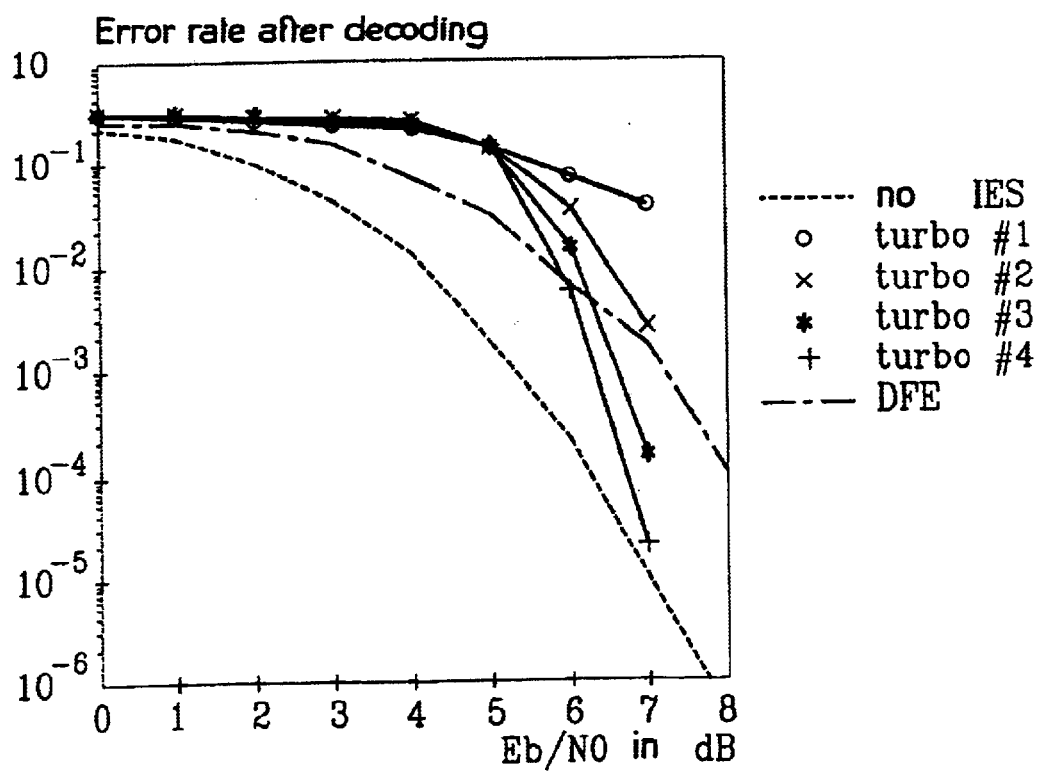
FIG. 6 is a graph plotting the error rate after decoding as a function of the ratio $E_b/N_0$, illustrating the performance of apparatus of the type shown in FIGS. 2 to 3 for 16-QAM modulation on a Porat and Friedlander channel.

The binary error rate (BER) is plotted in FIGS. 5 and 6 as a function of the ratio $E_b/N_0$ at the output from the turbo-equalizer for a Porat and Friedlander channel, respectively for four-state phase shift keying (4-PSK) and for 16-state amplitude modulation on two carriers in quadrature (16-QAM). On this channel which has the reputation of being rather difficult to equalize, the performance of the apparatus proposed by the invention, after four iterations, coincides with that of a channel having no intersymbol interference and encoding, providing the signal-to-noise ratio is greater than 4 dB for 4-PSK modulation and greater than 7 dB for 16-QAM modulation.

Figure 7:
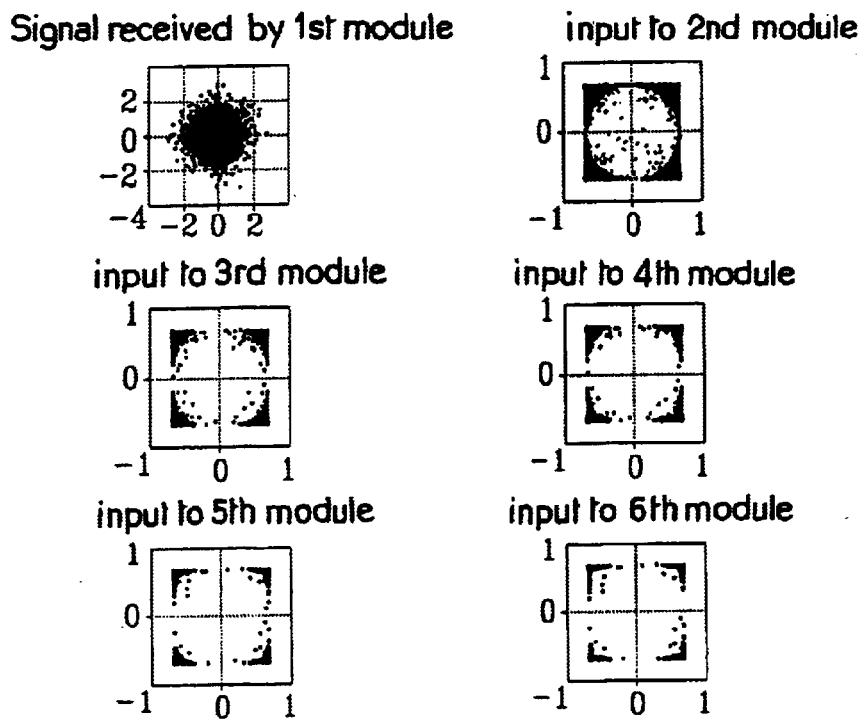
FIGS. 7 and 8 are diagrams of the signal constellations at the inputs of the transversal filters of successive modules in apparatus of the type shown in FIGS. 2 and 3 for 4-PSK and 16-QAM type modulation respectively, with a ratio $E_b/N_0$ respectively equal to 4 dB and to 7 dB.

In FIG. 7, there can be seen firstly the constellation of the signal as received for a ratio $E_b/N_0=4$ dB and secondly the constellations of the signals available at the inputs to the filters $\tilde{Q}(f)$ for iterations 1 to 5 (the mean values for the symbols $d_n$) It can be seen that as from the third iteration, these signals posses a constellation that is very close to that of 4-PSK modulation. Thus, for a signal-to-noise ratio greater than or equal to 4 dB, the filter $\tilde{Q}(f)$ is capable of reconstructing the intersymbol interference present at the output of the filter $\tilde{P}(f)$.

Figure 8:
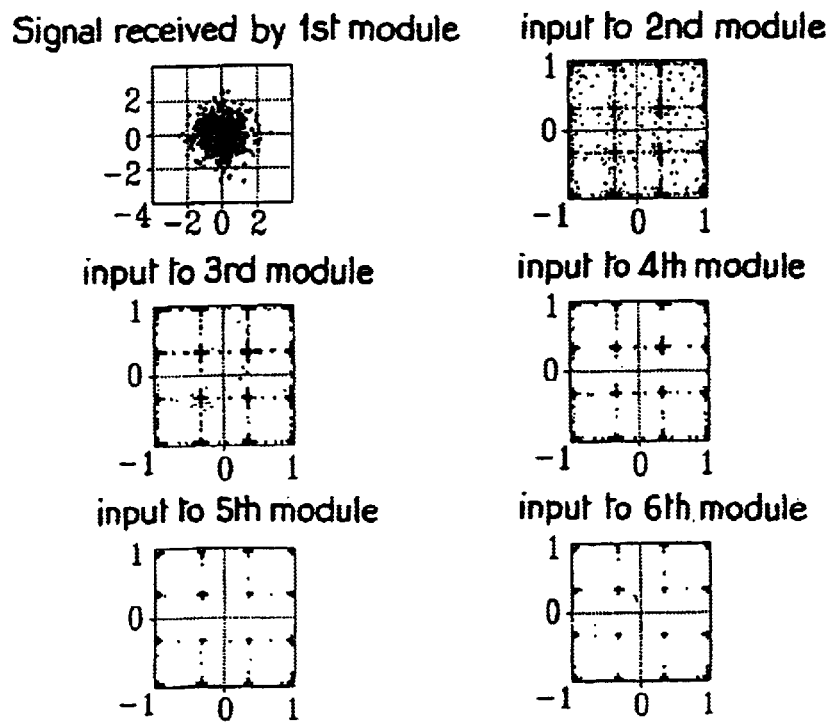

FIG. 8 shows the constellation of the received signal and also the constellations of the signals placed at the inputs of the filter $\tilde{Q}(f)$ in terms of the mean values for the symbols $d_n$, for iterations 1 to 5 and for a ratio $E_b/N_0=7$ dB. As from the fourth iteration, these signals possesses a constellation very close to that of 16-QAM modulation. Thus, providing the signal-to-noise ratio is better than or equal to 7 dB, the output from the equalizer can be free from intersymbol interference.

Consequently, the apparatus of the invention makes it possible to overcome completely the frequency selectivity of said channel without simultaneously raising the level of noise, and that cannot be done with a decision feedback equalizer (DFE) continuously operating on the basis of true data. For a BER of $10^{-5}$ the gain relative to a DFE type equalizer is about 1.5 dB for 4-PSK modulation and about 2 dB for 16-QAM modulation.

For a Channel as Proposed by Proakis

Figure 9:
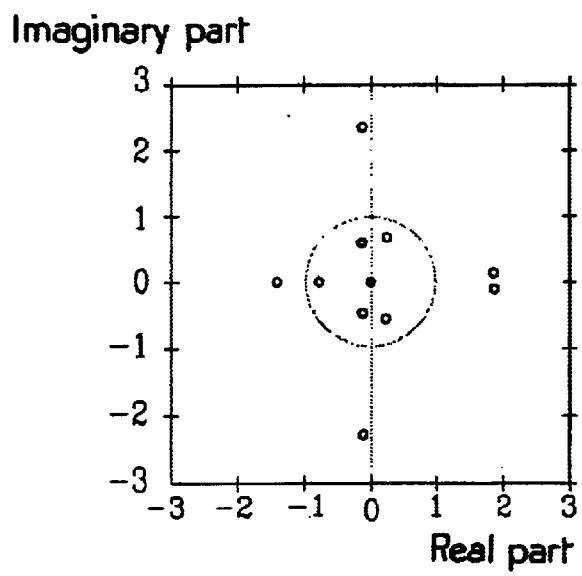
FIG. 9 is a graph on which there are plotted the zeros of the transfer function of a Proakis channel.

The channel proposed by Proakis has eleven coefficients $\Gamma_k$ which are real and constant. The positions of the zeros on the unit circle of the transfer function of that channel are shown in FIG. 9.

[0.04; −0.05; 0.07; −0.21; −0.5; 0.72; 0.36; 0; 0.21; 0.03; 0.07]

Figure 11:
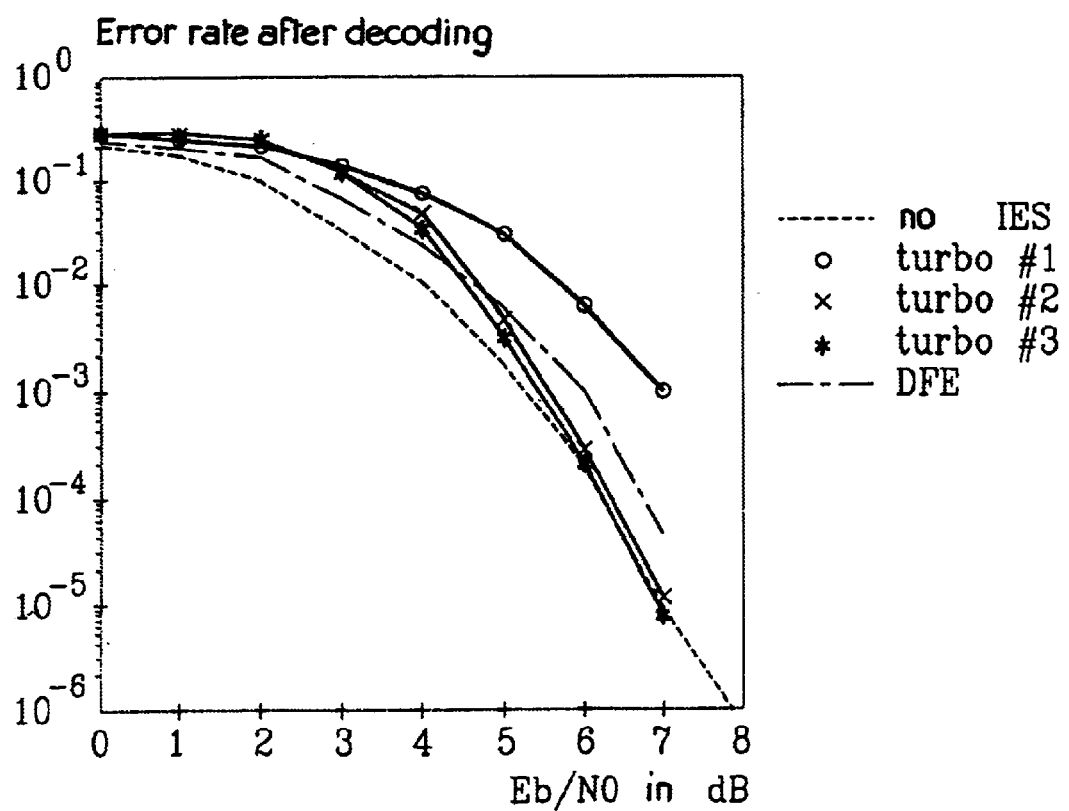
FIGS. 10 and 11 are graphs similar to those of FIGS. 5 and 6 illustrating the performance of apparatus of the invention on a Proakis channel respectively for 4-PSK and for 16-QAM modulation.
Figure 10:
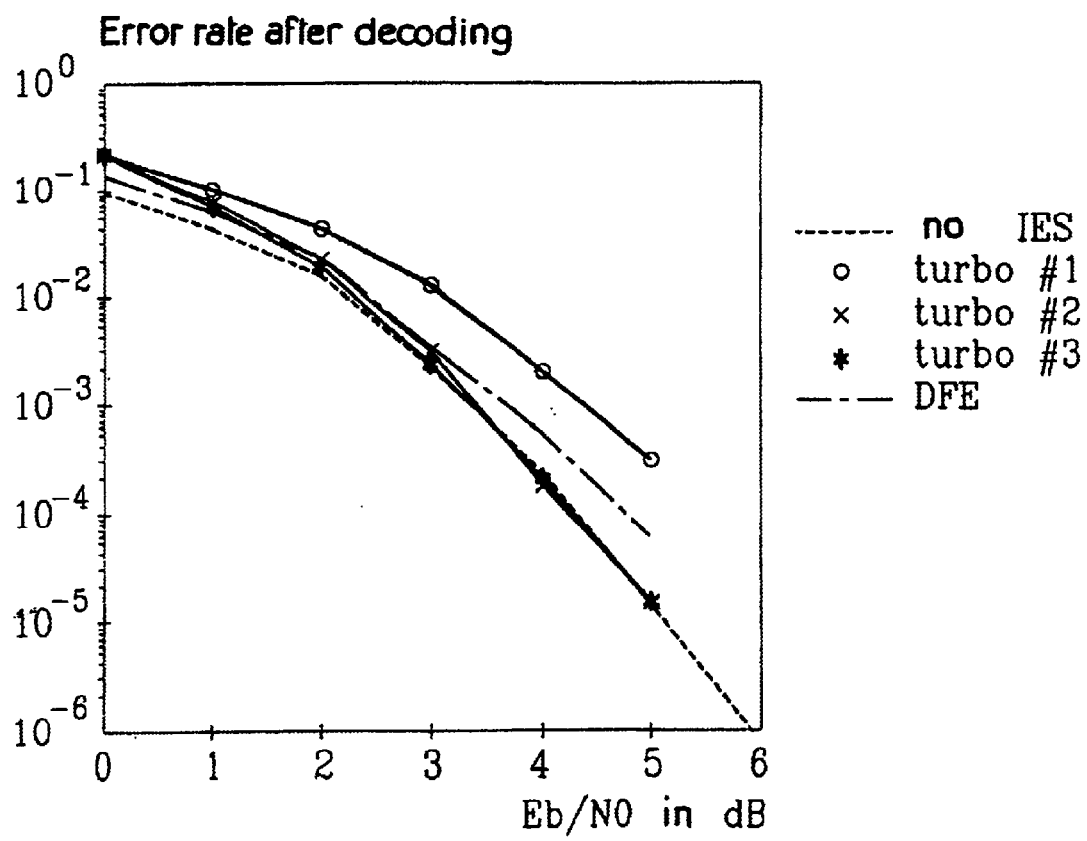

In FIGS. 10 and 11, the binary error rate (BER) is plotted as a function of the ratio $E_b/N_0$ at the output from the turbo-equalizer for a channel as proposed by Proakis, respectively for four-state phase shift keying (4-PSK) and for sixteen-state amplitude modulation on two carriers in quadrature (16-QAM). With this channel, two iterations suffice for the performance of the turbo-equalizer to coincide with that of a channel having no intersymbol interference and encoding, providing the signal-to-noise ratio is greater than or equal to 2 dB for 4-PSK modulation and greater than or equal to 6 dB for 16-MAQ modulation. It will be observed that the turbo-equalizer always gives rise to better performance than a decision feedback equalizer operating on true data, even if the improvement is no more than 0.5 dB for an error rate of $10^{-5}$.

APPLICATIONS

The apparatus described above is advantageously applied to channels that possess impulse responses that spread over several tens of symbol times. For such channels, it is not possible to envisage using a receiver that is optimized on the basis of the maximum likelihood criterion.

Specifically, the invention is advantageously applicable to transmission over a radio channel for a mobile terminal, over a cable channel, or indeed over an acoustic undersea channel.

It is applicable to any transmission system using linear modulation such as two- or four-state phase-shift keying (2-PSK, 4-PSK, or 4-QAM), or amplitude modulation on one or two carriers in quadrature (M-QAM).

The encoding system can be of the convolutional type or of the block type and the decoder must have weighted output, i.e. it must be capable of associating reliability information with each decoded symbol.

We claim:

1. Equalizing and decoding apparatus including in series a plurality of equalizer and weighted output decoder modules, each module except a first module receiving a stream of channel samples that has been delayed by a quantity equal to the processing time of the preceding modules, wherein each module except the first module includes a weighted output decoder and an equalizer having a first transversal filter which is a filter adapted to receive the stream of delayed channel samples and which is capable of reducing noise power, and in each module except the first module, each said equalizer includes a second transversal filter which is adapted to receive a stream of symbol mean values from the output of the preceding module and which is capable of reconstructing the intersymbol interference present at the output of the first transversal filter, the output of each said equalizer corresponding to the outputs of the first transversal filter minus the intersymbol interference as reconstructed by the second transversal filter.

2. Apparatus according to claim 1, characterized in that, for modules except the first module, the transversal filter which receives the stream of delayed channel samples is a filter which converges towards an adapted filter.

3. Apparatus according to claim 1 or claim 2, wherein each of said modules includes an M-ary to binary converter.

4. Apparatus according to claim 3, wherein said each module except the first module includes, upstream from an interleaver and downstream from the weighted output decoder, means for calculating the mean values of the symbols.

5. Apparatus according to claim 1 or claim 2, wherein said each of module except the first module includes an interleaver downstream from its weighted output decoder, and a deinterleaver between its equalizer and the weighted output decoder.

6. Apparatus according to claim 1 or claim 2, wherein the coefficients of at least one of said first and second transversal filters is determined in an adaptive manner by a stochastic gradient algorithm using a least squares error criterion between the output of the equalizer and the decoded data output from the module.

\* \* \* \* \*